: US 7,628,199 B2
: Dec. 8, 2009

(12) United States Patent
Rothenhöfer et al.

(54) HEAT EXCHANGER, IN PARTICULAR AIR/AIR COOLER

(75) Inventors: Horst Rothenhöfer, Lauffen (DE); Philipp Spaney, Stuttgart (DE)

(73) Assignee: Behr Industrietechnik GmbH & Co., Stuttgart (DE)

( * ) Notice: Subject to any disclaimer, the term of this patent is extended or adjusted under 35 U.S.C. 154(b) by 166 days.

(21) Appl. No.: 10/550,495

(22) PCT Filed: Mar. 18, 2004

(86) PCT No.: PCT/EP2004/002802

§ 371 (c)(1), (2), (4) Date: Sep. 26, 2005

(87) PCT Pub. No.: WO2004/085947

PCT Pub. Date: Oct. 7, 2004

(65) Prior Publication Data

US 2006/0231240 A1    Oct. 19, 2006

(30) Foreign Application Priority Data

Mar. 26, 2003  (DE)  ................. 103 13 684
Jun. 5, 2003   (DE)  ................. 103 25 763

(51) Int. Cl.
*F28F 13/00*    (2006.01)
*F28D 1/02*     (2006.01)

(52) U.S. Cl. ............. 165/146; 165/82; 165/134.1; 165/153; 165/166

(58) Field of Classification Search ........... 165/82, 165/134.1, 146, 151–153, 166
See application file for complete search history.

(56) References Cited

U.S. PATENT DOCUMENTS

| 3,542,124 | A |   | 11/1970 | Manfredo et al. |
| 3,613,782 | A |   | 10/1971 | Mason et al. |
| 4,049,051 | A |   | 9/1977  | Parker |
| 4,254,819 | A | * | 3/1981  | Worrell ............ 165/134.1 |
| 4,256,177 | A | * | 3/1981  | Saperstein ......... 165/151 |
| 5,035,284 | A | * | 7/1991  | Oya et al. ......... 165/146 |
| 5,671,806 | A |   | 9/1997  | Schmalzried |
| 5,709,264 | A | * | 1/1998  | Sweeney et al. .... 165/146 |
| 5,758,718 | A | * | 6/1998  | de Lazzer et al. .. 165/153 |
| 5,845,701 | A | * | 12/1998 | Ruppel et al. ..... 165/153 |
| 5,983,992 | A | * | 11/1999 | Child et al. ....... 165/153 |
| 6,019,169 | A |   | 2/2000  | Ruppel et al. |
| 6,755,158 | B2|   | 6/2004  | Knecht et al. |
| 2001/0027857 | A1 |   | 10/2001 | Emrich et al. |
| 2001/0040024 | A1| * | 11/2001 | Blanda et al. ..... 165/134.1 |

FOREIGN PATENT DOCUMENTS

DE    195 19 633 A1    12/1996

(Continued)

*Primary Examiner*—Leonard R Leo
(74) *Attorney, Agent, or Firm*—Foley & Lardner LLP

(57) ABSTRACT

The invention relates to a heat exchanger (1), in particular an air-cooled air cooler consisting of a block (2) with first (7) and second (9) flow channels, arranged in a cross-flow configuration, for a first gaseous medium that is to be cooled and a second cooling gaseous medium. According to the invention, the first flow channels (7) are connected on the inlet and outlet side to collection contairers (4) mounted on the block (2) and fins (10) are located in the second flow channels (9).

19 Claims, 4 Drawing Sheets

FOREIGN PATENT DOCUMENTS

| | | |
|---|---|---|
| DE | 196 44 584 C2 | 4/1998 |
| DE | 196 51 625 A1 | 6/1998 |
| DE | 198 08 202 A1 | 9/1999 |
| DE | 198 57 382 A1 | 6/2000 |
| DE | 200 03 919 U1 | 6/2000 |
| DE | 101 02 088 A1 | 8/2001 |
| DE | 100 41 121 A1 | 3/2002 |
| DE | 101 36 861 A1 | 2/2003 |
| DE | 102 02 768 A1 | 7/2003 |
| DE | 198 30 846 B4 | 3/2007 |

* cited by examiner

HEAT EXCHANGER, IN PARTICULAR AIR/AIR COOLER

The invention relates to a heat exchanger, in particular an air/air cooler.

Heat exchangers of this type have been disclosed by DE-C 195 19 633.

Air/air coolers, in particular air-cooled charge-air coolers, are generally produced in cross-current design, in which the flow passages for the gas to be cooled, e.g. the charge air of an internal combustion engine, are connected at their ends to manifolds, known as air boxes. There are two main known designs of coolers of this type, namely on the one hand a flat-tube design, in which the cooler block is composed of flat tubes and corrugated fins arranged between them, e.g. as described in DE-A 196 51 625. Secondly, there is what is known as the packet design, in which the flow passages for both media are formed by metal plates (planar plates) which are stacked on top of one another and between which corrugation fins and lateral terminating strips are arranged. The entire block is then brazed.

One problem of these air/air coolers is presented by the thermal stresses which result on account of the high and quickly fluctuating temperature differences between the two media. By way of example, when cooling charge air for internal combustion engines by means of ambient air, the cooling operation is subject to very non-steady-state conditions, in which fluctuating temperature differences of from 100 to 200 degrees Celsius can occur within a short period of time. On account of the high temperature differences, expansions which can lead to cracks or leaks in the cooler are produced in particular in the inlet region of the tubes or flow passages for the gas which is to be cooled, i.e. the charge air.

DE-C 195 19 633, in the name of the present Applicant, has proposed that, to avoid thermally induced expansion, expansion joints be provided on the air inlet side of a water-cooled charge-air cooler, so as to partially compensate for the expansion of the corrugation fins in the transverse direction. On the other hand to avoid the formation of vapor bubbles and hot corrosion in the flat tubes guiding the cooling water, it has been proposed that the finned part of the inlet region of the air passages be dimensioned in such a manner that less heat is transferred from the hot charge air to the cooling water in this region, for example by using a smooth fin in the air inlet region and a slotted corrugation fin downstream of the inlet region. These measures were proposed for a liquid-cooled charge-air cooler of flat tube design, i.e. exclusively on the charge air side.

It is an object of the present invention to improve a heat exchanger of the type described in the introduction, in particular an air-cooled charge-air cooler, in such a manner that thermally induced stresses are reduced and therefore cracks and leaks in the cooler are avoided.

According to the invention, in the inlet regions of the first flow passages, i.e. of the flow passages for the hot gas which is to be cooled, e.g. the charge air, there are means which impede the transfer of heat in this inlet region. Therefore, less heat is transferred to the adjacent flow passages containing the cooling medium, e.g. air, in the inlet region, where the medium to be cooled is at its hottest, than in the remaining region of the flow passage. This measure allows a demonstrable reduction in the stress peaks caused by the non-steady-state cooling processes.

According to an advantageous configuration of the invention, two different types of corrugated fins, known as internal corrugation fins, are arranged in the first flow passages, the internal corrugation fin in the inlet region being dimensioned in such a manner that it takes up less heat from its surroundings, for example on account of having a lower thermal expansion coefficient, which can be achieved, for example, by a lower fin density or a smooth surface. Moreover, the internal corrugation fin has a higher thermal conductivity and a higher flexural strength in the inlet region. By contrast, the corrugation fin which adjoins the inlet region is designed as a high-performance fin, i.e. is studded with gills and has a high fin density, which means that it takes up the maximum amount of heat, which it then releases to the adjacent cooling passages. This prevents the inlet regions of the cooling passages from overheating, and consequently prevents high stress peaks.

According to a further advantageous configuration of the invention, the block of the heat exchanger is produced in a packet design which is known per se, i.e. the flow passages for both gaseous media are delimited in a similar way, namely by planar plates and profiled or terminating strips running in the longitudinal direction, with internal corrugation fins or turbulence inserts located in the flow passages. The measures according to the invention have proven particularly advantageous in this design.

In a further configuration of the invention, expansion joints—which are known per se from the prior art cited in the introduction—are provided in the second flow passages, in which the gaseous cooling medium, e.g. air, is flowing. Here, the expansion joints, which are arranged approximately adjacent to the inlet region of the first flow passages for the medium which is to be cooled, are provided as additional measures. This compensates for transverse expansion of the corrugation fins in the region of the expansion joints and reduces stresses.

In a further configuration of the invention, fins with a lower height, e.g. in the form of turbulence inserts, are arranged on both sides of the expansion joints, so that the heat transfer surface area is also increased in the region of the expansion joint. This therefore allows sufficient heat exchange between two adjacent flow passages to take place even in the region of the expansion joint.

According to a further advantageous configuration of the invention, a greater wall thickness is provided in the inlet region of the first flow passages for the (hot) gas which is to be cooled, thereby increasing the strength. A greater wall thickness can advantageously be achieved by fitting a sleeve into the inlet region.

An exemplary embodiment of the invention is illustrated in the drawing and described in more detail in the text which follows. In the drawing.

Figure 1:
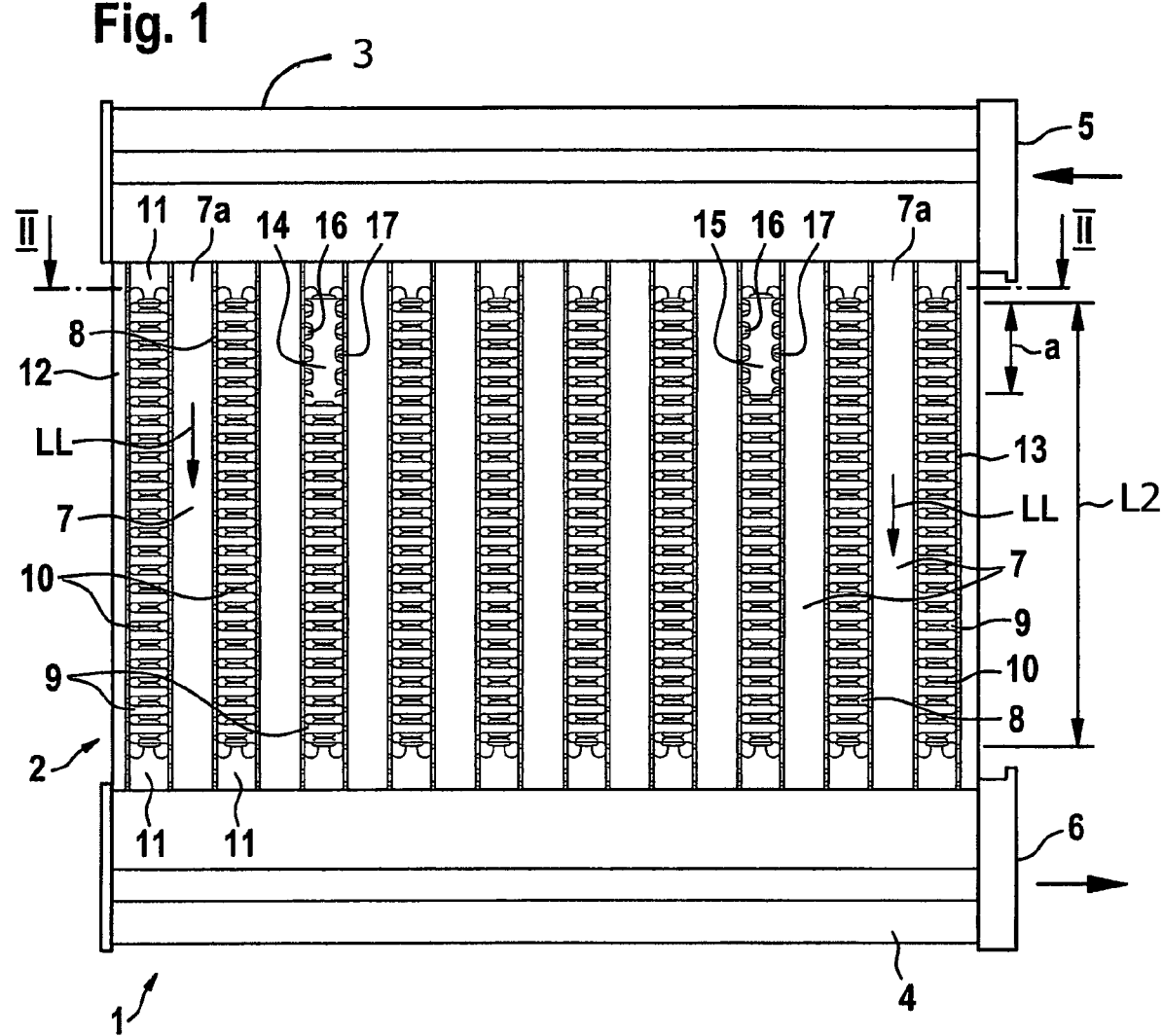
FIG. 1 shows an air/air cooler with two expansion joints.

FIG. 1 shows a heat exchanger as an air-cooled charge-air cooler 1 which can be used to cool charge air in internal combustion engines by means of ambient air. However, this heat exchanger 1 can also be used for other purposes in which a hot gaseous medium is to be cooled by another gaseous medium. The charge-air cooler 1 includes a block 2 which is produced in what is known as the packet design, as well as two manifolds 3, 4, which are fitted onto the block and tightly joined to it, e.g. by welding. The upper manifold 3, also known as an air box, has an inlet opening 5, through which a gas which is to be cooled, i.e. for example the charge air for an internal combustion engine (not shown), enters. The lower manifold 4 has an outlet opening 6 from which the cooled gas emerges again from the cooler 1. The manifolds 3, 4 are connected by first flow passages 7 which carry the gas that is to be cooled. The flow passages 7 are delimited on both sides by planar plates 8 which extend from the upper manifold 3 to the lower manifold 4. The gas which is to be cooled therefore flows from the top downward, which is indicated by arrows LL (charge air). Second flow passages 9, through which a second gas, a coolant, e.g. ambient air, flows, are arranged between or adjacent to the first flow passages 7. To improve the heat transfer, corrugation fins 10 are arranged in the second flow passages 9, extending over the entire width of the second flow passages 9. The direction of flow of the cooling gas runs perpendicular to the plane of the drawing. Therefore, the first and second gas flow in cross-current with respect to one another. The second flow passages 9 are delimited by profiled or terminating strips 10 on their longitudinal sides, i.e. adjacent to the upper manifold 3 and the lower manifold 4. Therefore, the second flow passages 9 are in each case delimited by two plates 8 and two profiled strips 11 and have a rectangular cross section which is filled by the corrugation fins 9. The block 2 is laterally delimited by in each case one side part 12, 13. The charge-air cooler 1 has in total ten second flow passages, i.e. air passages 9, of which two flow passages (the third and the eighth) each have an expansion joint 14, 15, which extends in the direction of longitudinal flow and has a width a. The two expansion joints 14, 15 are therefore arranged adjacent to the inlet regions 7a of the charge-air passages 7. On both sides of the expansion joints 14, 15, fins 16, 17 of a lower height, i.e. what are known as turbulence inserts, are arranged on the plates 8. The fin assembly is therefore interrupted in the region of the expansion joints 14, 15, and the plates 8 lying opposite one another are decoupled.

Figure 2:
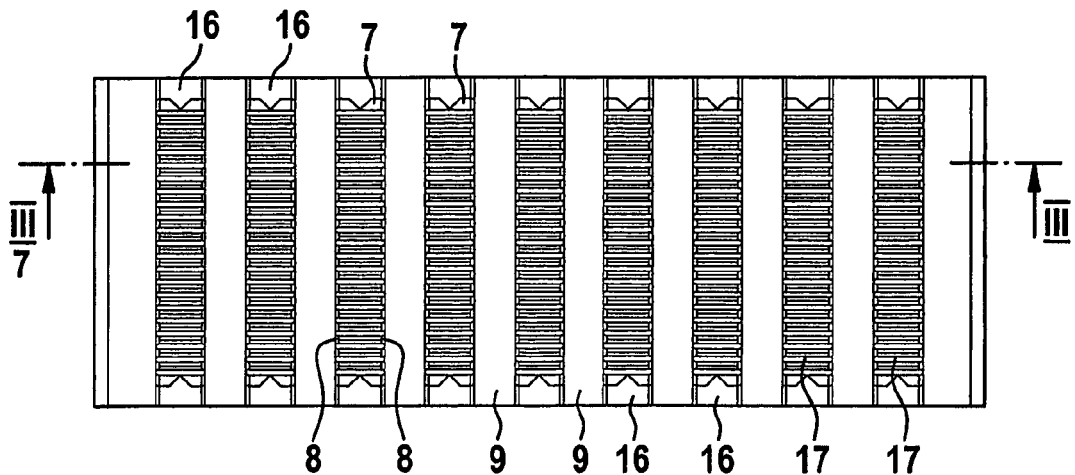
FIG. 2 shows a section on line II-II through the cooler shown in FIG. 1.

FIG. 2 shows a section on line II-II through the charge-air cooler 1 shown in FIG. 1. In the text which follows, identical reference designations are used for identical parts. As has already been mentioned, the first flow passages 7 are delimited by the planar plates 8 and in the direction of longitudinal flow on the narrow side by profiled or terminating strips 16. The cross section of the flow passages 7, in which the charge air—based on the plane of the drawing—flows from the top downward, is filled by internal corrugation fins 17 for improving the heat transfer. All parts of the cooler block 2, i.e. the plates 8, the corrugation fins 10, the terminating strips 11, 16, the internal corrugation fins 17 and the side parts 12, 13 are preferably made from aluminum alloys and are brazed together after they have been stacked on top of one another. Then, the manifolds 3, 4 are welded onto the brazed cooler block 2.

Figure 3:
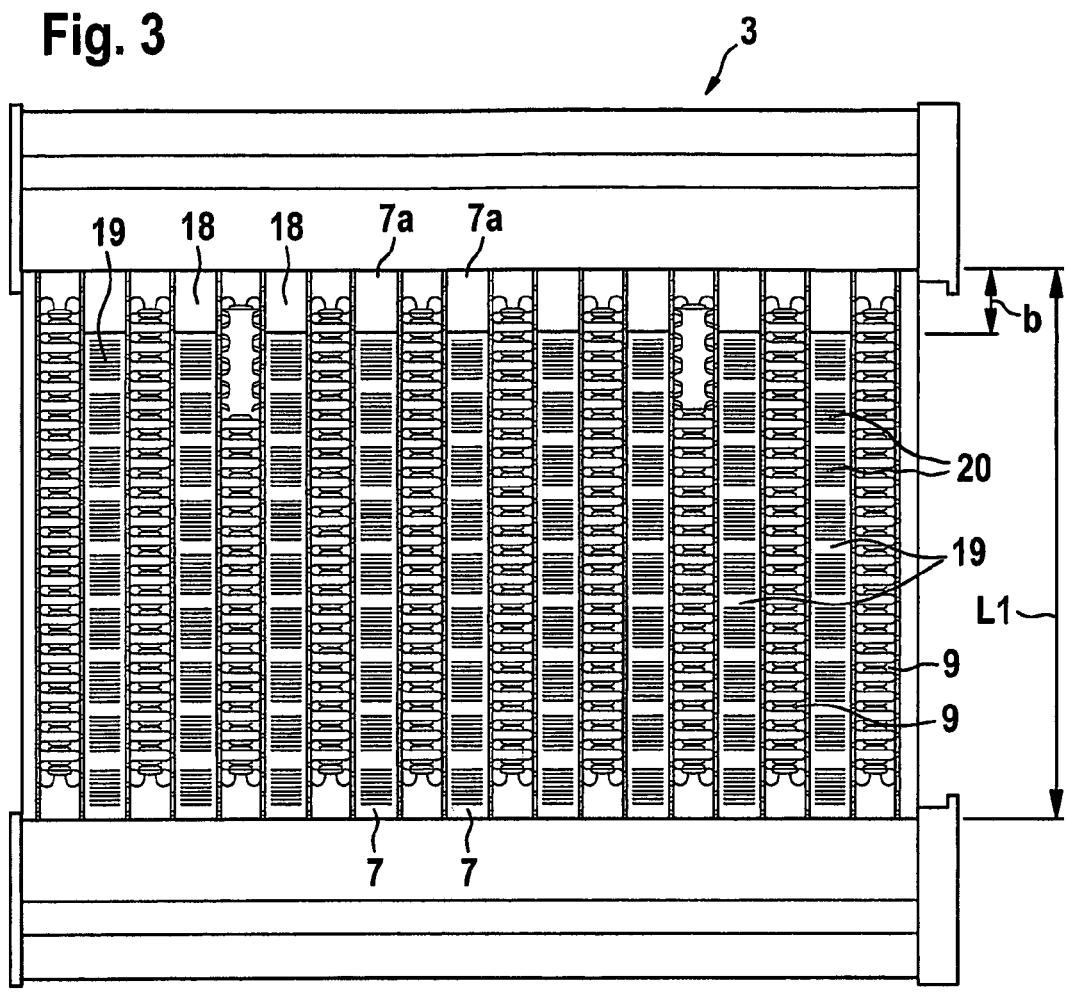
FIG. 3 shows a section on line III-III through the cooler shown in FIG. 2.

FIG. 3 shows a section on line III-III through the cooler shown in FIG. 2. The illustration of the charge-air cooler 1 corresponds to that shown in FIG. 1, but in this case corrugation fins are illustrated in the first flow passages 7 for the charge air, and specifically first internal corrugation fins 18, which extend down to a depth b in the direction of flow LL of the charge air, are arranged in the inlet regions 7a. Second internal corrugation fins 19, which extend over the remainder of the total length L1 of the flow passages 7, are arranged downstream of the first internal corrugation fins 18, as seen in the direction of flow. The first internal corrugation fin 18 differs from the second internal corrugation fin 19 by virtue of having a lower heat transfer capacity, i.e. for example by virtue of a lower heat transfer coefficient on account of having a smooth surface or a lower fin density. The second internal corrugation fin 19 is configured as a high-performance corrugation fin, i.e. its surface is slotted and studded with sets of gills 20 for increasing the heat transfer. On account of these differently designed internal corrugation fins 18, 19, the heat transfer to the surroundings is lower in the inlet regions 7a of the charge-air passages 7, and consequently these regions are heated to a lesser extent. After it has flowed over the distance b, the charge air has already reached a lower temperature and then comes into contact with the high-performance corrugation fin 19, where maximum heat exchange with the adjacent cooling passages 9 can take place.

Figure 4:
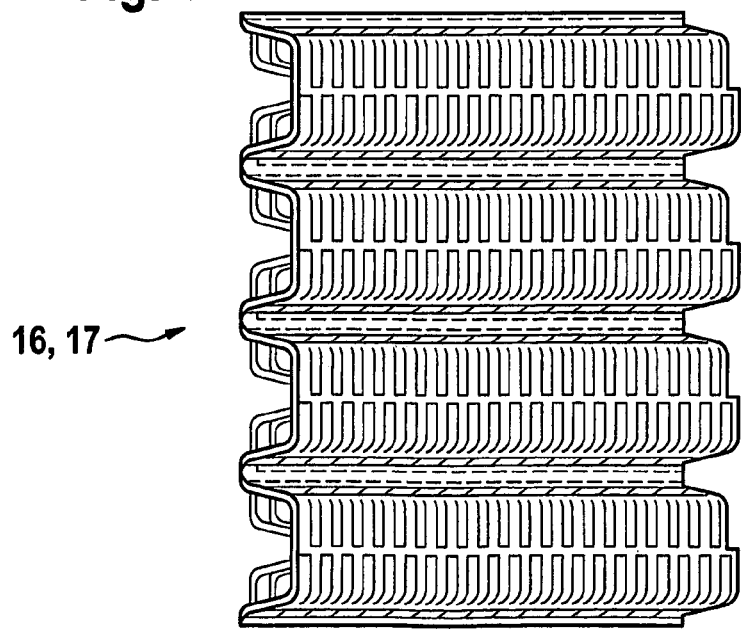
FIG. 4 shows what is known as a turbulence insert for the region of the expansion joint.

FIG. 4 shows what is known as a turbulence insert 16, 17 as illustrated in FIG. 1 in the region of the expansion joints 14, 15, on an enlarged scale. This is a known configuration of a corrugation fin of trapezoidal design with slotted side flanks which constantly interrupt the flow and thereby ensure a high level of turbulence.

Figure 5:
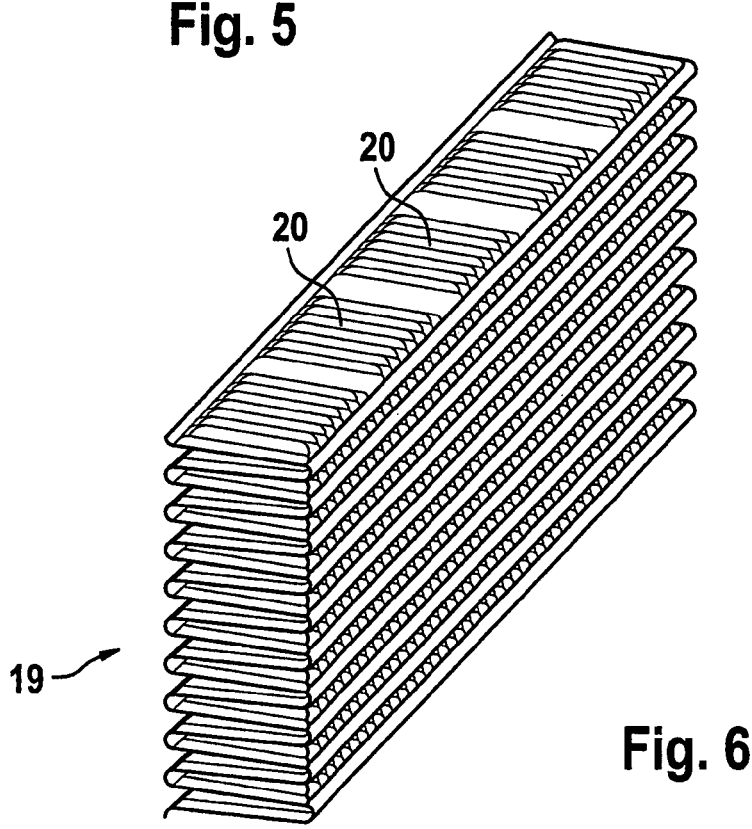
FIG. 5 shows a slotted internal corrugation fin.

FIG. 5 shows what is referred to as the high-performance corrugation fin 19, as illustrated in FIG. 3, in this case in the form of an enlarged perspective view, clearly revealing the sets of gills 20. The number of gills, the angles of the gills and the fin density can be varied in order to vary the heat transfer capacity.

Figure 6:
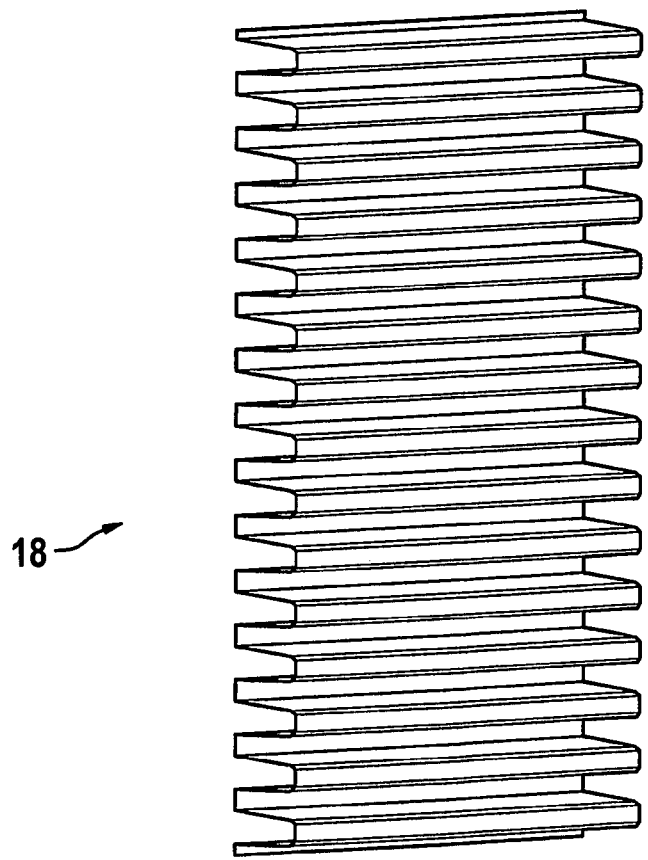
FIG. 6 shows a smooth internal corrugation fin.

FIG. 6 shows the internal corrugation fin 18 as arranged in the inlet regions 7a of the charge-air passages 7 in FIG. 3, i.e. an internal corrugation fin which has a lower heat transfer capacity, in particular a lower heat transfer coefficient, than the high-performance corrugation fin shown in FIG. 5. This is immediately obvious from the smooth surface and the lower fin density.

Figure 7:
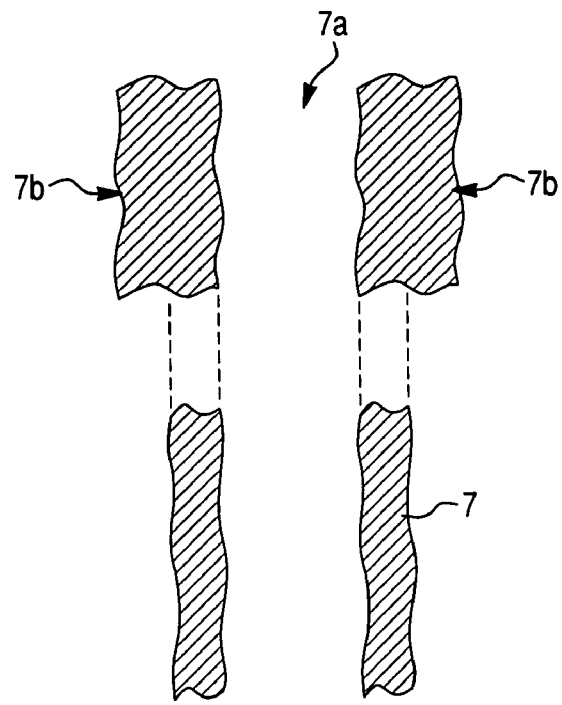
FIG. 7 shows a cross-sectional view of a first flow passage.
Figure 8:
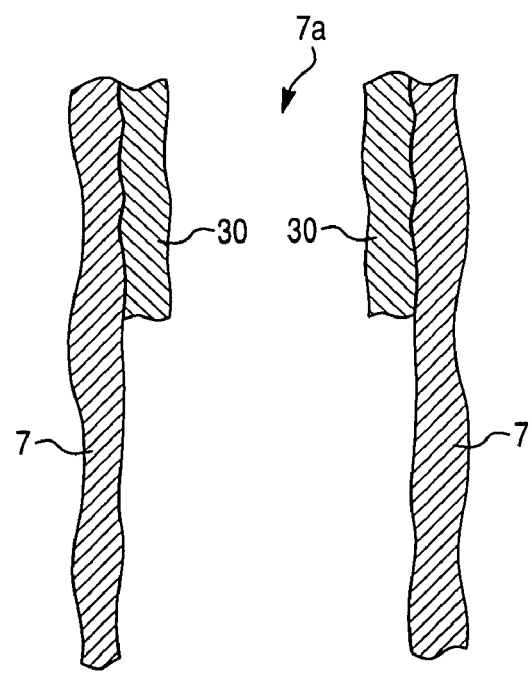
FIG. 8 shows a cross-sectional view of a first flow passage with a sleeve.

FIG. 7 shows a cross-sectional view of a first flow passage 7, wherein the first flow passage 7 has an increased wall thickness 7b in the inlet region 7a of the first flow passage. FIG. 8 shows a cross-sectional view of a first flow passage 7 with an increased wall thickness due to the insertion of a sleeve 30 in the inlet region 7a of the first flow passage 7. The structures shown in FIGS 7 and 8 are well known in the art and are not critical to the patentability of the invention.

List of Designations

1 Charge-air cooler
2 Cooler block
3 Upper manifold
4 Lower manifold
5 Inlet opening
6 Outlet opening
7 First flow passages
8 Plates
9 Second flow passages
10 Corrugation fins
11 Terminating strips
12 Side part
13 Side part
14 Expansion joint
15 Expansion joint
16 Terminating strips
17 Internal corrugation fin
18 First internal corrugation fin
19 Second internal corrugation fin
20 Set of gills

The invention claimed is:

1. A heat exchanger, comprising:
a block with at least one first flow passage for a first gaseous medium, which is to be cooled, and at least one second flow passage for a second gaseous medium, which is a cooling medium, wherein the at least one first and at least one second flow passages are in a cross-current arrangement with respect to one another, wherein the at least one first flow passage is connected on an inlet side and an outlet side to manifolds fitted onto the block, and wherein fins are arranged in the second flow passage, a heat transfer device, which has a different heat transfer capacity in the inlet region than in an adjoining region, is arranged in the at least one first flow passage, wherein the heat transfer device includes internal corrugation fins, wherein a first internal corrugation fin is arranged in the inlet region and a second internal corrugation fin is arranged in a remaining region of the at least one first flow passage, wherein the first internal corrugation fin has a higher thermal conductivity than the second internal corrugation fin.

2. The heat exchanger as claimed in claim 1, wherein the first internal corrugation fin has a smooth, unslotted surface and the second internal corrugation fin has a surface studded with gills.

3. The heat exchanger as claimed in claim 1, wherein the at least one first flow passage has a length L1 and the inlet region has a depth b, wherein the depth b has the following relative range: $0.01\ L1 \leq b \leq 0.5\ L1$.

4. The heat exchanger as claimed in claim 3, wherein the depth b has the following relative range: $0.05\ L1 \leq b \leq 0.3L1$.

5. The heat exchanger as claimed in claim 4, wherein the depth b has the following relative range: $0.1\ L1 \leq b \leq 0.2L1$.

6. The heat exchanger as claimed in claim 1, wherein the block is produced in packet design so that the at least one first and the at least one second flow passages are formed with planar plates and terminating strips in a longitudinal direction of the block.

7. The heat exchanger as claimed in claim 1, wherein the at least one second flow passage has an expansion joint adjacent to the inlet region of the at least one first flow passage, which extends in a direction of longitudinal flow of the at least one second flow passage.

8. The heat exchanger as claimed in claim 7, wherein the expansion joints, transversely with respect to the direction of longitudinal flow, have a width a and a length L2, wherein the width a is in the following range: $0.05\ L2 < a <= L2$.

9. The heat exchanger as claimed in claim 7, wherein flat fin elements are arranged in the second flow passage on both sides of the expansion joint.

10. The heat exchanger as claimed in claim 1, wherein the first internal corrugation fin has a lower fin density than the second internal corrugation fin.

11. The heat exchanger as claimed in claim 1, wherein the heat exchanger is an air cooled air cooled air cooler.

12. The heat exchanger as claimed in claim 1, wherein the at least one first flow passage has an increased wall thickness in the inlet region.

13. The heat exchanger as claimed in claim 12, wherein the wall thickness is increased by a sleeve inserted in the inlet region.

14. A heat exchanger, comprising:
a block with at least one first flow passage for a first gaseous medium, which is to be cooled, and at least one second flow passage for a second gaseous medium, which is a cooling medium, wherein the at least one first and the at least one second flow passages are in a cross-current arrangement with respect to one another, wherein the at least one first flow passage is connected on an inlet side and an outlet side to manifolds fitted onto the block, and wherein fins are arranged in the at least one second flow passage, a heat transfer device which has a different heat transfer capacity in the inlet region than in an adjoining region is arranged in the at least one first flow passage, wherein the heat transfer device includes internal corrugation fins, wherein a first internal corrugation fin is arranged in the inlet region and a second internal corrugation fin is arranged in a remaining region of the at least one first flow passage, wherein the first internal corrugation fin has a higher flexural strength than the second internal corrugation fin.

15. The heat exchanger as claimed in claim 14, wherein the first internal corrugation fin has a lower heat transfer coefficient than the second internal corrugation fin.

16. The heat exchanger as claimed in claim 14, wherein the first internal corrugation fin has a lower fin density than the second internal corrugation fin.

17. The heat exchanger as claimed in claim 14, wherein the at least one first flow passage has an increased wall thickness in the inlet region.

18. The heat exchanger as claimed in claim 17, wherein the wall thickness is increased by a sleeve inserted in the inlet region.

19. The heat exchanger as claimed in claim 14, wherein the first internal corrugation fin has a smooth, unslotted surface and the second internal corrugation fin has a surface studded with gills.

* * * * *